United States Patent
Bradbury (10) Patent No.: US 7,766,290 B1
(45) Date of Patent: Aug. 3, 2010

(54) ADJUSTABLE ASSEMBLY FOR HANGING COOKWARE AND UTENSILS

(76) Inventor: Michael Sean Bradbury, P.O. Box 2879, Edwards, CO (US) 81632

(*) Notice: Subject to any disclaimer, the term of this patent is extended or adjusted under 35 U.S.C. 154(b) by 10 days.

(21) Appl. No.: 11/983,546

(22) Filed: Nov. 9, 2007

Related U.S. Application Data (60) Provisional application No. 60/859,414, filed on Nov. 16, 2006, provisional application No. 60/936,077, filed on Jun. 18, 2007.

(51) Int. Cl.
*A47F 5/00* (2006.01)

(52) U.S. Cl. ............ 248/200.1; 248/340; 248/304

(58) Field of Classification Search .......... 248/200.1, 248/339, 340, 304, 305; 211/106.01, 124
See application file for complete search history.

(56) References Cited

U.S. PATENT DOCUMENTS

| | | | | |
|---|---|---|---|---|
| 1,613,447 A | * | 1/1927 | Ellberg | 211/123 |
| 1,814,692 A | * | 7/1931 | Harris | 211/123 |
| 2,611,492 A | * | 9/1952 | Watts | 211/113 |
| 2,757,804 A | * | 8/1956 | Sadwin | 211/94.01 |
| 2,758,904 A | | 8/1956 | Hansell | |
| 2,788,132 A | | 4/1957 | Lewis | |
| 2,987,289 A | * | 6/1961 | Wamsley | 248/341 |
| 3,379,484 A | | 4/1968 | Kiling | |
| 3,627,143 A | * | 12/1971 | Alexander | 211/123 |
| 3,780,875 A | | 12/1973 | Scholl | |
| 3,998,332 A | | 12/1976 | Lambertson | |
| 4,290,531 A | | 9/1981 | Lazarus | |
| 4,714,166 A | | 12/1987 | Hann et al. | |
| 5,238,127 A | | 8/1993 | Geller | |
| D392,130 S | * | 3/1998 | Wangler | D6/511 |
| 6,039,191 A | | 3/2000 | Purnell | |
| 6,227,387 B1 | | 5/2001 | Rose | |
| 6,729,479 B2 | | 5/2004 | Morgan | |
| 6,976,595 B1 | | 12/2005 | Geller | |
| 7,007,808 B2 | | 3/2006 | Morgan | |
| 7,104,409 B2 | | 9/2006 | Morgan | |
| 7,121,413 B2 | | 10/2006 | Morgan | |

* cited by examiner

*Primary Examiner*—J. Allen Shriver, II
*Assistant Examiner*—Steven M Marsh
(74) *Attorney, Agent, or Firm*—Leyendecker & Lemire, LLC; Albert Haegele (57) ABSTRACT

An improved method of storing and retrieving cookware and utensils utilizing an assembly attached to the underside of an accommodating surface. The assembly incorporates hanger assemblies whose positions are adjustable along the length of the assembly. The hanger assemblies utilize hooks that hang in a downward vertical position and are capable of rotating and pivoting around their vertical axis. The assembly can be mounted onto any accommodating horizontal surface inside of an enclosed area such as a cabinet or in open space. The assembly can hang any cookware, utensil, or item with an accommodating appendage from which it could be hung.

19 Claims, 4 Drawing Sheets

ADJUSTABLE ASSEMBLY FOR HANGING COOKWARE AND UTENSILS

CROSS-REFERENCE TO RELATED APPLICATIONS

This application claims the benefit of provisional patent application Ser. No. 60/859,414, filed 2006 Nov. 16 and Ser. No. 60/936,077 filed 2007 Jun. 18 by the present inventor.

FEDERALLY SPONSORED RESEARCH

Not Applicable

SEQUENCE LISTING OR PROGRAM

Not Applicable

BACKGROUND OF INVENTION

1. Field of Invention

This invention relates to Utensil Hangers, specifically to such utensils as kitchen cookware that is stored inside of conventional kitchen cabinets.

2. Background of Invention

Kitchen cabinet cookware and utensil storage has always been awkward, inefficient, and cumbersome. The problem of storing several different sized and shaped cookware and utensils inside cabinets has made their storage nearly impossible to do in a manner that is satisfactory for anyone who desires a neat and efficient kitchen. The problem of cookware storage has been compounded over the recent decades by the introduction and ubiquitous adaptation of non-stick cookware. This style of cookware utilizes Teflon as a non-stick surface between the cookware's metal surface and the food being cooked allowing the food to be easily removed from the cookware and ease it's cleaning. Teflon used in this manner has one major draw back; it is fragile and susceptible to damage from contact with metal utensils or the metal from other pots and pans. Teflon coated cookware also has exposed metal bottoms, sides and handles which when stacked upon each other inside of cabinets causes the damaging contact that can cause the Teflon to peal from the cooking surface thus eliminating Teflon as an advantage to the cookware.

One method of safe guarding the Teflon coating of non-stick cookware would be to not stacking the cookware in a manner that would allow metal to Teflon contact. This method of in cabinet storage would be an inefficient use of cabinet space, as each piece of cookware would need its own shelf area on the cabinet's shelves. Another alternative would be the use of a hanging cookware holder which would be mounted from the ceiling and hang in the kitchen exposed in the kitchen's open area. This method of cookware storage would leave the cookware exposed as well as consuming space in the kitchen that could be used for other purposes when the cookware is not needed. Cookware hanging in the kitchen and can be also an unsightly eyesore.

There have been several attempts in the past to help lesson the problem of kitchen cookware and utensil cabinet storage but none have so far been satisfactory for conveniently and neatly store these items.

3. Prior Art

There have been many attempts in the past to solve the problem of cookware and utensil storage in kitchens, and these attempts can be categorized into several types of devices invented.

The most popular device utilized for cookware and utensil storage is the hanging storage rack. These types of racks are most popular in larger kitchens where they can be hung in the open space of the kitchen thus taking up useful kitchen workspace. The cookware is also exposed creating an eyesore for most who desire a neat and clean kitchen. Most of these racks have been issued a Design patent since these racks have little or no unique features to produce unexpected results to warrant a Utility patent.

U.S. Pat. No. 4,290,531 issued Sep. 22, 1981 to Lazarus details a device for holding cooking pots and lids. The device does hang pots and lids but fails to have adjustable or moveable hooks and the hooks must work in concert with lid holders to suspend both pots and lids.

U.S. Pat. No. 4,714,166 issued Dec. 22, 1987 to Hann and Fuller details a supporting rack for cooking utensils. The rack has a framed structure that supports several hooks along its framed perimeter. The rack was intended to hang from the kitchen ceiling or from another structure providing enough structural strength and area to hang the rack and the cookware hung by it. The hooks are only able to slide along the framed perimeter and are unable to pivot and rotate. This device was envisioned for use in an open area of the kitchen and not inside of a closed structure like a cabinet.

U.S. Pat. No. 5,238,127 issued Aug. 24, 1993 to Geller details a pan holder that is attached to the ceiling, stores pans in an overhead position near the end of a flexible cantilever beam which can be pulled down to allow easy removal of the pots and pans. The holder does not however allow for adjustable hooks whereby the hooks can be moved into different positions along the holder as well as not being able to pivot and rotate. The holder is to be used in the open kitchen area and not in a closed area such as a cabinet.

U.S. Pat. No. 6,039,191 issued Jul. 2, 1997 to Purnell also details a hanging rack for being suspended from the ceiling in the open kitchen area. The structure is complicated in construction that results in a large, heavy, and expensive device for hanging cookware and utensils. The devices utilizes a plurality of bars from which it is to be hung from and hooks which are able to slide along the bars but unable to pivot and rotate.

U.S. Pat. No. 3,780,875 issued December 1973 to Scholl details a suspended hanger for pots and pans from an overhead surface. The device utilizes a base member and a column and a hanger assembly secured to the lower end of the column that rotates around the column. The hanger would be unable to fit inside of a conventional kitchen cabinet, as it would require a large vertically symmetric area for operating the rotational hanger feature of the device. The individual hangers cannot be independently positioned in relation to the other hangers therefore the entire device must be rotated in order to reposition the cookware.

Another pot rack was U.S. Pat. No. 3,998,332 by Lambertson on Dec. 21, 1976 that details a horizontal rack member supporting hooks. Lambertson's patent unfortunately does not allow for rotating and pivoting hooks as well as the hooks positions are not intended to be adjusted along the length of the rack while cookware is in use.

U.S. Pat. No. 2,788,132 issued May 17, 1954 to Lewis describes an adjustable hanger for storm windows but also has other hanging applications. Lewis's hangers are individually adjustable in position along the assembly but the hooks cannot rotate or pivot to accommodate different hanging positions or ease in its use. The hooks themselves are described as flat and rectangular shaped which severely limits the types of objects that can be hung from the hooks.

Another method of cookware storage incorporates the use of pull out cabinet racks. U.S. Pat. No. 3,379,484 issued April 1968 to King details a pivoted rack for utensils and the like, which incorporates sheets of pegboard that can be swung outside of the cabinet storage space. Unfortunately this rack would not be functional in a cabinet that had a divider between the cabinet doors, and the hooks are only adjustable in which the positions the user had placed them prior to hanging utensils. The hanger is also cumbersome in construction and installation and is not adjustable in size therefore could not universally fit different sized cabinets.

U.S. Pat. No. 2,758,904 issued May 28, 1954 to Hansell also describes a pull out pan rack but unfortunately the product suffers from many of the same shortcomings as Kling's patent. Hansell's rack would slide in and out of the cabinet space, the rack itself constructed from pegboard or the like. The hanger is cumbersome in construction and installation and is not adjustable in size therefore could not universally fit different sized cabinets. The hooks are also only adjustable in which the positions the user had placed them prior to hanging utensils.

Another attempt to solve the kitchen cookware and utensil storage problem is the introduction of pull out hanging racks. U.S. Pat. No. 6,227,387 issued May 8, 2001 to Rose details an apparatus for supporting utensils. Rose's design allows for the rack to be pulled out of the cabinet from it's supporting base, which would be mounted inside of a cabinet. Rose's design unfortunately does not allow for adjustable hooks. Rose's hooks are fixed to one piece thus not allowing for independent positioning of the hooks as well as his hooks cannot rotate and pivot. Rose's design would make multiple cookware placement cumbersome since different pieces of cookware have different dimensions and would require different hook interval positions for each piece of cookware. Rose's sound accentuating feature would also make hanging and retrieving cookware less convenient since each one would be between adjacent cookware and thus become an obstacle to one using Rose's device.

Another pull out hanging rack was U.S. Pat. No. 6,976,595 by Geller on Dec. 20, 2005. Geller's patent unfortunately suffers from some of the same shortcomings as Rose's patent in that the hooks remain stationary and therefore does not allow the assembly to fully accommodate the user's need in storing and retrieving cookware. Geller's and Rose's assemblies would also require a cabinet space which is deep in length from front to back to accommodate a pull out rack of this nature, something rarely seen in any kitchen as most cabinets are wider than they are long.

Another method of storing cookware in a cabinet is the use of wire storage racks inside of the cabinet. U.S. Pat. No. 6,729,479 issued to Morgan on May 4, 2004 details a wire storage rack for pots and pans that can be mounted on a base. This style of storage device is unfortunately inconvenient in use since it requires the user to navigate the wires with cookware in it's storage in order to store the piece of cookware in hand. The device also uses the base of the cabinet instead of being able to hang from an overhead plane thus consuming the base of the cabinet's storage area while not offering more storage volume than a hanging device.

U.S. Pat. Nos. 7,104,409, 7,121,413, and 7,007,808 all detail wire storage racks of much the same configuration as Morgan's patent, and all unfortunately all suffer from the same short comings as Morgan's patent as they are all complicated in construction and use.

OBJECTS AND ADVANTAGES

The advantages of the in cabinet kitchen cookware hanger are as follows:
(a) to provide a more efficient method to utilize the storage volume inside of a kitchen cabinet for cookware and utensil storage;
(b) to provide a more efficient and convenient method of cookware and utensil storage and retrieval during kitchen operation;
(c) to provide an improved method of cookware and utensil organization;
(d) to provide a cookware storage solution for fragile Teflon coated cookware from the damage that could occur if the cookware was to be stored in with conventional methods;
(e) to provide adjustable hanger assemblies to accommodate varying sizes of storage areas in which the assemblies would be installed.
(f) Another advantage for one embodiment is the ability to utilize the cabinet shelf the cookware hanger is attached to for additional cabinet storage for more cookware, dinnerware or utensils;
(g) Further objects and advantages of my invention will become apparent from a consideration of the drawings and ensuing description.

SUMMARY

The Cabinet Hanging Assembly for Cookware and Utensils is an assembly for hanging implements with accommodating appendages comprising an elongated base or bar from which the assembly is attached to the underneath side of a horizontal plane, hanger assemblies whose positions are adjustable along length of the base, and hooks which hang from hanger assemblies in a downward vertical position which can rotate and pivot their vertical axis.

| REFERENCE NUMERALS | |
|---|---|
| 20. | Cabinet shelf |
| 21. | Shelf supports |
| 22. | Hanger track |
| 23. | Hanger slider |
| 24. | Hanger rotating pivot |
| 25. | Hanger hook |
| 26. | Hanger assembly |
| 27. | Track sections |
| 28. | Track mount assembly |
| 29. | Track end |
| 30. | Rack mount assembly |

-continued

| REFERENCE NUMERALS | |
|---|---|
| 31. | Rack mount |
| 32. | Hanger base |
| 33. | Hanger bar |
| 34. | Hanger bar assembly |
| 35. | Bar section |
| 36. | Cabinet bar mount assembly |
| 37. | Cabinet base attachment |
| 38. | Cabinet wall |
| 39. | Bar adjuster |

DESCRIPTION

Figure 1:
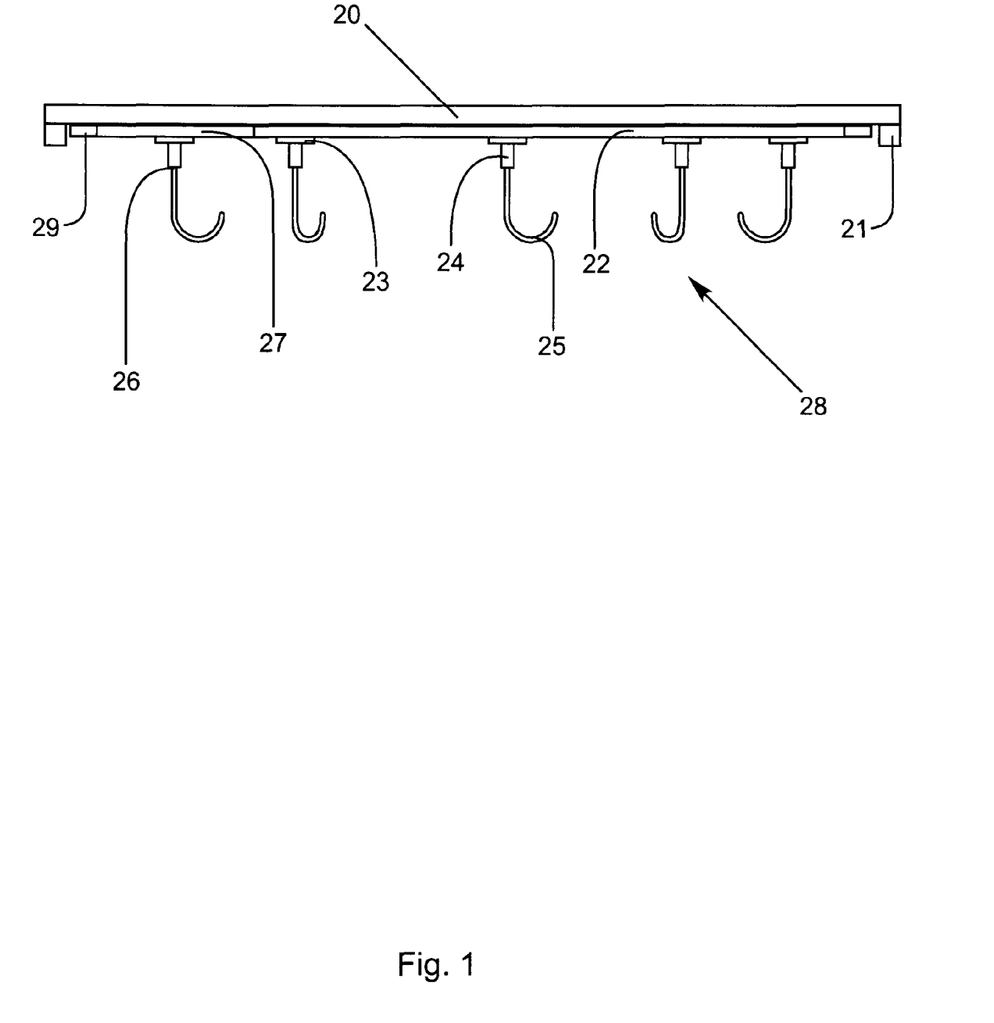
FIG. 1 is a front view of the Track mount embodiment of the Cabinet Hanging Assembly for Cookware and Utensils.

Preferred Embodiment FIG. 1

FIG. 1 is an illustration of the Track Mount embodiment of the assembly that consists of the Cabinet Hanging Assembly for Cookware and Utensils. A kitchen cabinet shelf (20) is in place inside of the cabinet resting on its original shelf supports (21). The Hanger track (22) is attached to the bottom of the cabinet shelf (20) by screws or other accommodating means. Hanger slider (23), Hanger rotating pivot (24), and Hanger hook (25) are all assembled as one unit as Hanger assembly (26). Hanger assemblies (26) rest on the Hanger track (22) by its Hanger slider (23) and are capable of sliding freely along Track (22). Hanger rotating pivot (24) allows the Hanger hook (25) to rotate 90° or greater and pivot 5° or greater from hooks (25) vertical axis protruding from hanger assemblies (20).

Track mount assembly (28) may be adjustable in length to accommodate different sized cabinets or hanging areas through removable track sections (27), which would also be attached to the Shelf (20) by the same means as the Hanger track (22). The number of Hanger assemblies (26) may also be adjusted by the addition or removal of Assemblies (26) from Track (22). Track ends (29) on either side of Track (22) or Sections (27) are removable to accommodate Hanger assembly (26) or Track section (27) addition or removal.

OPERATION

Preferred Embodiment FIG. 1

FIG. 1 shows the assembly that consists of the Track Mount embodiment for the Cabinet Hanging Assembly for Cookware and Utensils. The Hanger track (22) is fastened to the bottom of the Cabinet shelf (20) thus making the Track (22) the stationary component of the Cabinet hanger. Hanger hook (25) allow for any cookware or utensils with hooks or accommodating appendages to hang from assemblies (26). Cookware or utensils hanging from the assemblies (26) can be moved along the length of track (22) via the Hanger Sliders (23). Cookware and utensils can also be rotated as well as pivot around the Hanger hooks (25) vertical axis through the Pivot (24). The ability to move cookware or utensils along the Track (22) as well as being able to rotate and pivot will allow the user to better manage the storage volume inside the cabinet by manipulating the positions and placement of the cookware or utensils as well as ease the job of storage and retrieval. Since the cookware hanger utilizes a Cabinet shelf (20) for support it is possible to also use the shelf for added storage while also utilizing the cookware hanger.

Hanger track (22) may also be adjustable in length to accommodate different sized cabinets or hanging areas through removable Track sections (27). Track ends (29) on either end of the Track (22) could be removed to accommodate the addition or removal of Track sections (27) to Track (22) or other Track sections (27). The number of Hanger assemblies (26) may also be adjusted by the addition or removal of Assemblies (26) from Track (22) and Sections (27) once the Ends (29) had been removed. Track ends (29) would be replaced at the ends of the Track (22) or sections (27) when the desired Assembly (28) length and number of Slider assemblies (26) had been achieved.

The Cabinet Hanging Assembly for Cookware and Utensils may not be limited for use in cabinets or for cookware and utensils. Applications for the Cabinet Hanging Assembly can be found anywhere there is a surface to attach the assembly to and hang the accommodating implements that need to be hung.

DESCRIPTION

Figure 2:
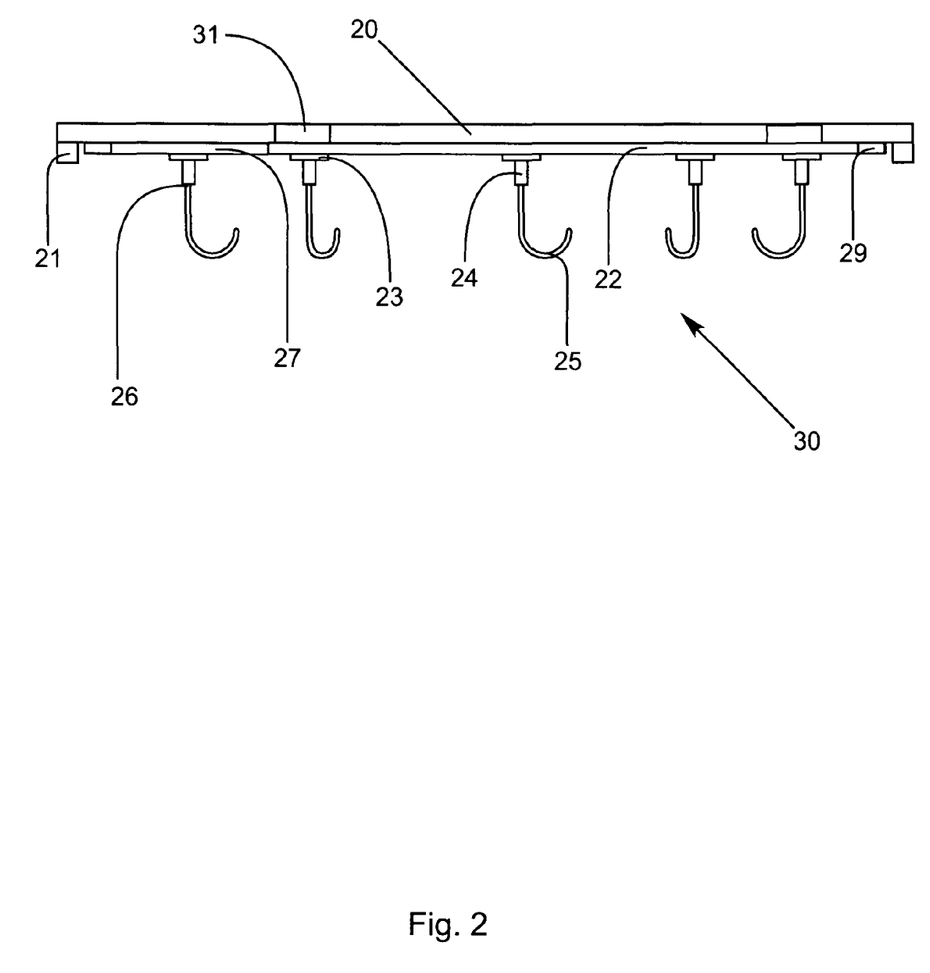
FIG. 2 is a front view of Rack Mount embodiment of the Cabinet Hanging Assembly for Cookware and Utensils.

Rack Mount FIG. 2

FIG. 2 is an illustration of the Rack Mount embodiment of the Cabinet Hanging Rack for Cookware and Utensils. A kitchen cabinet shelf (20) is in place inside of the cabinet resting on its original shelf supports (21). The Cookware hanger track (22) is attached to Rack mounts (31) that are attached to the cabinet shelf (20). Rack mounts (31) may also be attached to Track sections (27) for additional support to the assembly (30). Hanger slider (23), Hanger rotating pivot (24), and Hanger hook (25) are all assembled as one unit as Hanger assembly (26). Hanger assembly (26) rests on the cookware hanger track (22) by hanger slider (23) and are capable of sliding freely along track (22). Hanger rotating pivot (24) allows the Hanger hook (25) to rotate 90° or greater and pivot 5° or greater from hooks (25) vertical axis protruding from hanger assemblies (20).

Rack mount assembly (30) may be adjustable in length to accommodate different sized cabinets or hanging areas through removable track sections (27), which may also be attached to the Shelf (20) by the same means as the Hanger track (22). The number of Hanger assemblies (26) may also be adjusted by the addition or removal of Assemblies (26) from Track (22). Track ends (29) on either side of Track (22) or sections (27) are removable to accommodate Hanger assembly (26) or Track section (27) addition or removal.

OPERATION

Rack Mount FIG. 2

FIG. 2 is an illustration of the Rack Mount embodiment of the Cabinet Hanging Rack for Cookware and Utensils. The Cookware hanger track (22) is attached to Rack mounts (31) that are attached to the Cabinet shelf (20). Rack mounts (31) attach to the cabinet shelf (20) in a manner that would not incorporate the use of screws or bolts into the shelf (20) and would lessen the use of tools in the Assembly's (30) installation. Hanger hook (25) allows for any cookware or utensils with hooks or accommodating appendages to hang from assemblies (26). Cookware or utensils hanging from the assemblies (26) can be moved along the length of track (22) via the Hanger Sliders (23). Cookware can also be rotated and pivot around the Hanger hooks (25) vertical axis through the pivot (24). The ability to move cookware or utensils along the track (22) as well as being able to rotate and pivot will allow the user to better manage the storage volume inside the cabinet by manipulating the positions and placement of the cookware or utensils as well as ease the job of storage and retrieval.

Rack mount assembly (30) may also be adjustable in length to accommodate different sized cabinets or hanging areas through removable Track sections (27). Track ends (29) on either end of the Track (22) would be removed to accommodate the addition or removal of Track sections (27) to Track (22) or other Track sections (27). The number of Hanger assemblies (26) may also be adjusted by the addition or removal of Assemblies (26) from Track (22) and sections (27) once Track ends (29) had been removed. Track ends (29) would be replaced at the ends of the Track (22) or Sections (27) when the desired Assembly (30) length and number of Slider assemblies (26) had been achieved.

Since the cookware hanger utilizes a Cabinet shelf (20) for support it is possible to also use the shelf for added storage while also utilizing the cookware hanger.

DESCRIPTION

Figure 3:
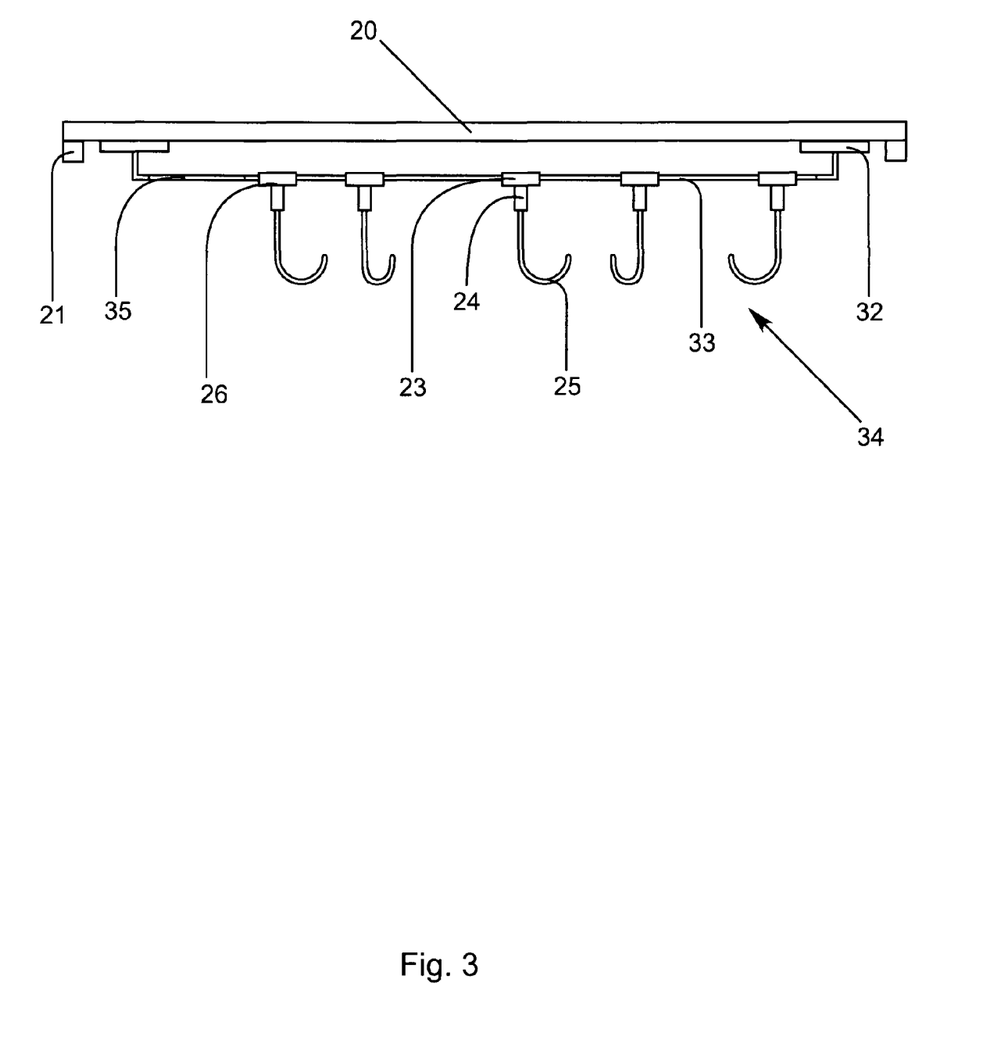
FIG. 3 is a front view of the Hanging Bar Mount embodiment of the Cabinet Hanging Assembly for Cookware and Utensils.

Hanging Bar Mount FIG. 3

FIG. 3 is an illustration of the Hanging Bar Mount embodiment of the Cabinet Hanging Rack for Cookware and Utensils. A kitchen cabinet shelf (20) is in place inside of the cabinet resting on its original shelf supports (21). Hanger base (32) is attached to the underside of the cabinet shelf (20) by screws or another accommodating means. The Hanger bar (33) is attached to Hanger bases (32) at both ends of the bar (33). Hanger slider (23), Hanger rotating pivot (24), and hanger hook (25) are all assembled as one unit as the individual hanger assembly (26). Hanger assemblies (26) rest on the Hanger bar (33) by its hanger slider (23) and are capable of sliding freely along the bar (33) allowing for assemblies to be in any position possible along bar (33). Hanger rotating pivot (24) allows for the Hanger hook (25) to rotate 90° or greater and pivot 5° or greater from hooks (25) vertical axis protruding from hanger assemblies (20).

Hanger bar assembly (34) may be adjustable in length to accommodate different sized cabinets or hanging areas through the addition or removal of removable Bar sections (35). Bar sections (35) can be added or removed to Hanger bar (33), Hanger base (32), and other Bar sections (35) to adjust the overall length of the Hanging bar assembly (34). The number of Hanger assemblies (26) may also be adjusted by the addition or removal of Assemblies (26) from Hanger bar (33) and Bar sections (35). Hanger bases (32) on either side of Bar (33) and Bar section (35) are removable to accommodate Hanger assembly (26) or Bar section (35) addition or removal.

OPERATION

Hanging Bar Mount FIG. 3

FIG. 3 is an illustration of the Hanging Bar Mount embodiment of the Cabinet Hanging Rack for Cookware and Utensils. Hanger hooks (25) allow for any cookware or utensils with hooks or accommodating appendages to hang from assemblies (26). Cookware or utensils hanging from the assemblies (26) can be moved along the length of Bar (33) and Bar section (35) via the Hanger Sliders (23). Hanging items can rotate 90° or greater and pivot 5° or greater from hooks (25) vertical axis protruding from hanger assemblies (20). The ability to hang and move cookware or utensils along the bar (33) as well as being able to rotate and pivot will allow the user to better manage the storage volume inside the cabinet by manipulating the positions and placement of the cookware or utensils as well as ease the job of storage and retrieval. Since the cookware hanger utilizes a cabinet shelf (20) for support it is possible to also use the shelf for added storage while also utilizing the cookware hanger.

Hanger bar assembly (34) may be adjustable in length to accommodate different sized cabinets or hanging areas through the addition or removal of removable Bar sections (35). Bar sections (35) can be added or removed to Hanger bar (33), Hanger base (32), and other Bar sections (35) to adjust the overall length of the Hanging bar assembly (34). The number of Hanger assemblies (26) may also be adjusted by the addition or removal of Assemblies (26) from Hanger bar (33) and Bar sections (35). Hanger bases (32) on either side of Bar (33) and Bar section (35) are removable to accommodate Hanger assembly (26) or Bar section (35) addition or removal.

DESCRIPTION

Figure 4:
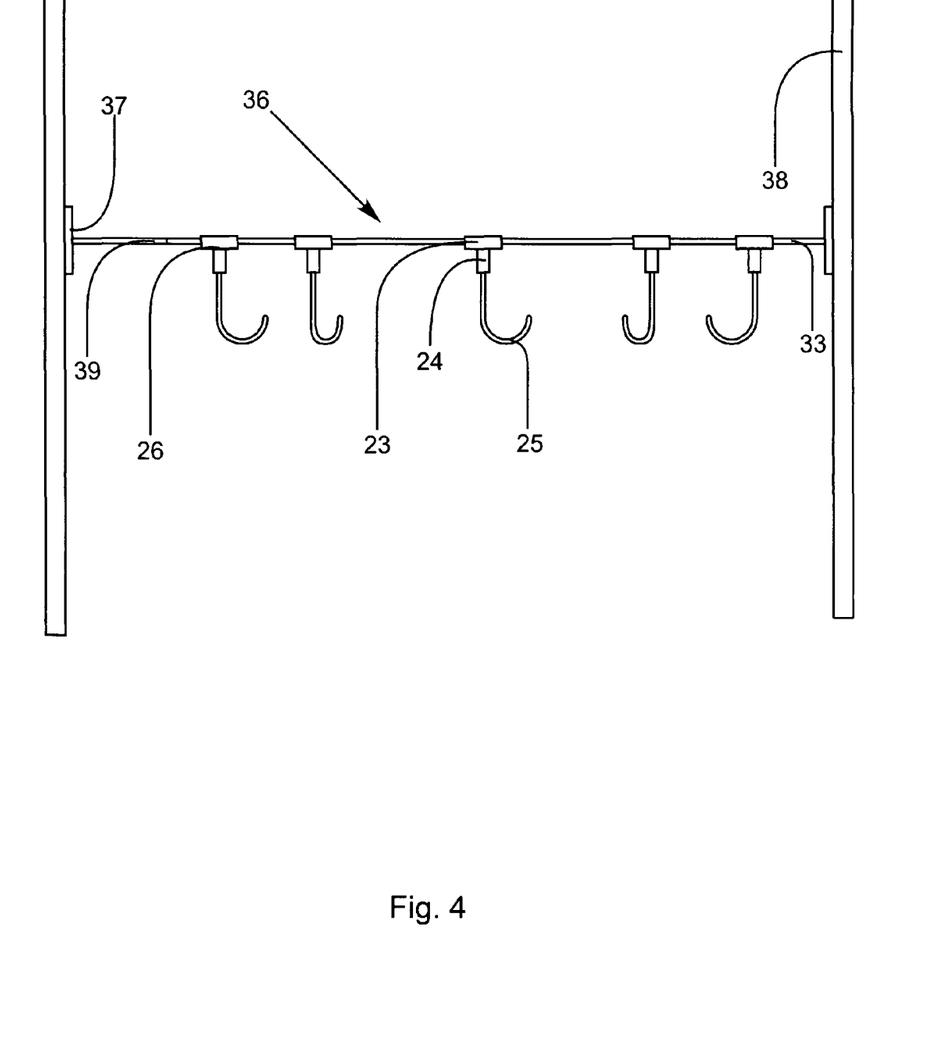
FIG. 4 is a front view of the Cabinet Bar Mount embodiment of the Cabinet Hanging Assembly for Cookware and Utensils.

Cabinet Bar Mount FIG. 4

FIG. 4 is an illustration of the Cabinet Bar Mount embodiment of the Cabinet Hanging Rack for Cookware and Utensils. The Hanger bar (33) is attached to the Cabinet base attachments (37) which are attached to the inside of Cabinet walls (38) or other accommodating vertical planes by screws or other accommodating means. Hanger slider (23), Hanger rotating pivot (24), and hanger hook (25) are all assembled as one unit as Hanger assembly (26). Hanger assemblies (26) rest on Hanger bar (33) by Hanger slider (23) and are capable of sliding freely along the length of Bar (33) allowing for assemblies to be in any position possible along Bar (33). Hanging items can rotate 90° or greater and pivot 5° or greater from hooks (25) vertical axis protruding from hanger assemblies (20).

Bar adjuster (39) can be adjusted to change the overall length of Cabinet bar assembly (36) to accommodate varying mounting areas. Adjuster (39) can be a screw type of adjuster whereby Adjuster (39) would be turned on its horizontal axis to lengthen or shorten Adjuster (39) length and thus alter the overall Assembly (36) length.

OPERATION

Cabinet Bar Mount FIG. 4

FIG. 4 is an illustration of the Cabinet Bar Mount embodiment of the Cabinet Hanging Rack for Cookware and Utensils. Hanger hook (25) allows for any cookware or utensils with hooks or accommodating appendages to hang from assemblies (26). Cookware or utensils hanging from the assemblies (26) can be moved along the length of bar (33) and Bar adjuster (39) via the Hanger Sliders (23). Hanging items can rotate 90° or greater and pivot 5° or greater from hooks (25) vertical axis protruding from hanger assemblies (20). The ability to move cookware or utensils along the bar (33) as well as being able to rotate and pivot will allow the user to better manage the storage volume inside the cabinet by manipulating the positions and placement of the cookware or utensils as well as ease the job of storage and retrieval. The cabinet mount bar assembly (36) does not require a cabinet shelf for support since the assembly (36) attaches directly to the interior walls of the cabinet or other accommodating vertical planes.

Cabinet mount bar assembly (36) may be adjustable in length to accommodate different sized cabinets or hanging areas through the adjustment of Bar adjuster (39). Bar adjuster (39) can be adjusted to change the overall length of Cabinet bar assembly (36) to accommodate varying mounting areas. Adjuster (39) can be a screw type of adjuster whereby adjuster (39) would be turned on its horizontal axis to lengthen or shorten adjuster (39) length and thus alter the overall assembly (36) length.

CONCLUSION

The In Cabinet Kitchen Cookware Hanger will allow for better utilization of limited kitchen cabinet volume when storing cookware while also protecting the Teflon coating inside of non-stick cookware from damage caused by incorrect storage by stacking the cookware on shelves.

The invention claimed is:

1. A cookware hanging assembly comprising:
an adjustable track having a plurality of removable track ends, wherein the adjustable track is configured to receive and release at least one separate track section when at least one of the plurality of removable track ends is removed; and
a plurality of hanger assemblies slideably coupled to the adjustable track, wherein each of the plurality of hanger assemblies comprise:
a sliding mechanism configured to slideably couple one of the plurality of hanger assemblies to the adjustable track a pivot mechanism, wherein the pivot mechanism is pivotable to;
pivot each of the plurality of hanger assemblies in a predetermined number of degrees from a central axis; and
wherein the pivot mechanism is rotatable to rotate each of the plurality of hanger assemblies in a predetermined number of degrees from the central axis; and
a hooking mechanism configured to hold cookware in a vertical position whereby said hanger assemblies are configured for attachment to a hanger bar.

2. The cookware hanging assembly of claim 1, wherein a first one of the plurality of hanger assemblies has a hooking mechanism having a first size and a second one of the plurality of hanger assemblies has a hooking mechanism having a second size different from the first size.

3. The cookware hanging assembly of claim 1, wherein the hooking mechanisms are configured to store cooking utensils in a vertical position.

4. The cookware hanging assembly of claim 1, wherein the at least one separate track section is configured to receive at least one of the plurality of removable track ends.

5. The cookware hanging assembly of claim 1, wherein the at least one separate track section is seamlessly coupled to an end portion of the of the adjustable track.

6. The cookware hanging assembly of claim 1, further comprising a plurality of mounts configured to secure the adjustable rack to an underside of a cabinet shelf.

7. The cookware hanging assembly of claim 1, wherein the adjustable track is configured to either i) receive at least one additional hanger assembly, or ii) release at least one of the plurality of hanger assemblies when at least one of the plurality of removable track ends is removed.

8. An assembly for hanging cookware comprising:
an adjustable bar configured to receive and release at least one separate bar section;
a plurality of hanger bases configured to secure the adjustable bar to an underside of a planar surface, wherein each of the plurality of hanger bases has a shaft configured to secure one or more of i) an end of the adjustable bar, and ii) an end of the at least one separate bar section, and wherein the shaft is configured to secure the adjustable bar a distance away from the underside of the planar surface, wherein the distance is greater than a width of the plurality of hanger bases;
a plurality of hanger assemblies slideably coupled to the adjustable bar, wherein each of the plurality of hanger assemblies comprise:
a sliding mechanism configured to slideably couple one of the plurality of hanger assemblies to the adjustable bar; a pivot mechanism, wherein the pivot mechanism is pivotable to
pivot each of the plurality of hanger assemblies in a predetermined number of degrees from a central axis; and
wherein the pivot mechanism is rotatable to rotate each of the plurality of hanger assemblies in a predetermined number of degrees from the central axis; and
a hooking mechanism configured to hold cookware in a vertical position whereby said hanger assemblies are configured for attachment to an adjustable track.

9. The assembly for hanging cookware of claim 8, wherein a first one of the plurality of hanger assemblies has a hooking mechanism having a first size and a second one of the plurality of hanger assemblies has a hooking mechanism having a second size different from the first size.

10. The assembly for hanging cookware of claim 8, wherein the at least one separate bar section is seamlessly coupled to the end portion of the of the adjustable track and the shaft of one of the plurality of hanger bases when the separate bar section is coupled to the adjustable bar.

11. The assembly for hanging cookware of claim 8, wherein the hooking mechanism is configured to store cooking utensils in a vertical position.

12. The assembly for hanging cookware of claim 8, wherein the adjustable bar is configured to either i) receive at least one additional hanger assembly or ii) release at least one of the plurality of hanger assemblies, when the adjustable bar is separated from either i) an end of the shaft, or ii) an end of the at least one separate bar section.

13. A cabinet rack for hanging cookware comprising:
a hanging bar coupled to a plurality of base attachments, wherein the base attachments are configured to secure the adjustable bar to side walls of a cabinet;
at least one removable adjustable bar section coupled to the hanging bar, wherein the adjustable bar section is configured to lengthen and shorten the overall length of the hanging bar using a twisting motion;
a plurality of hanger assemblies slideably coupled to the hanging bar, wherein each of the plurality of hanger assemblies comprise:
a sliding mechanism configured to slideably couple one of the plurality of hanger assemblies to the hanging bar a pivot mechanism, wherein the pivot mechanism is pivotable to;
pivot each of the plurality of hanger assemblies in a predetermined number of degrees from a central axis; and
wherein the pivot mechanism is rotatable to rotate each of the plurality of hanger assemblies in a predetermined number of degrees from the central axis; and
a hooking mechanism configured to hold cookware in a vertical position whereby said hanger assemblies are configured for attachment to an adjustable track.

14. The cabinet rack for hanging cookware of claim 13, wherein the at least one adjustable bar section is lengthened by the twisting motion in a first direction and wherein the at least one adjustable bar section is shortened by the twisting motion in a second direction.

15. The cabinet rack for hanging cookware of claim 13, wherein the hooking mechanisms are configured to store cooking utensils in a vertical position.

16. The cabinet rack for hanging cookware of claim 13, wherein the at least one adjustable bar section telescopes from a contracted position to an extended position.

17. The cabinet rack for hanging cookware of claim 13, wherein a first one of the plurality of hanger assemblies has a hooking mechanism having a first size and a second one of the plurality of hanger assemblies has a hooking mechanism having a second size different from the first size.

18. The cabinet rack for hanging cookware of claim 13, wherein at least one end of the at least one adjustable bar section is seamlessly coupled to the hanging bar.

19. The cabinet rack for hanging cookware of claim 13, wherein at least one end of the adjustable bar section is seamlessly coupled to at least one of the plurality of base attachments.

\* \* \* \* \*